No. 754,066. PATENTED MAR. 8, 1904.
E. G. HOFFMANN.
TELESCOPIC JOINT FOR SHAFTING, &c.
APPLICATION FILED OCT. 5, 1903.
NO MODEL.
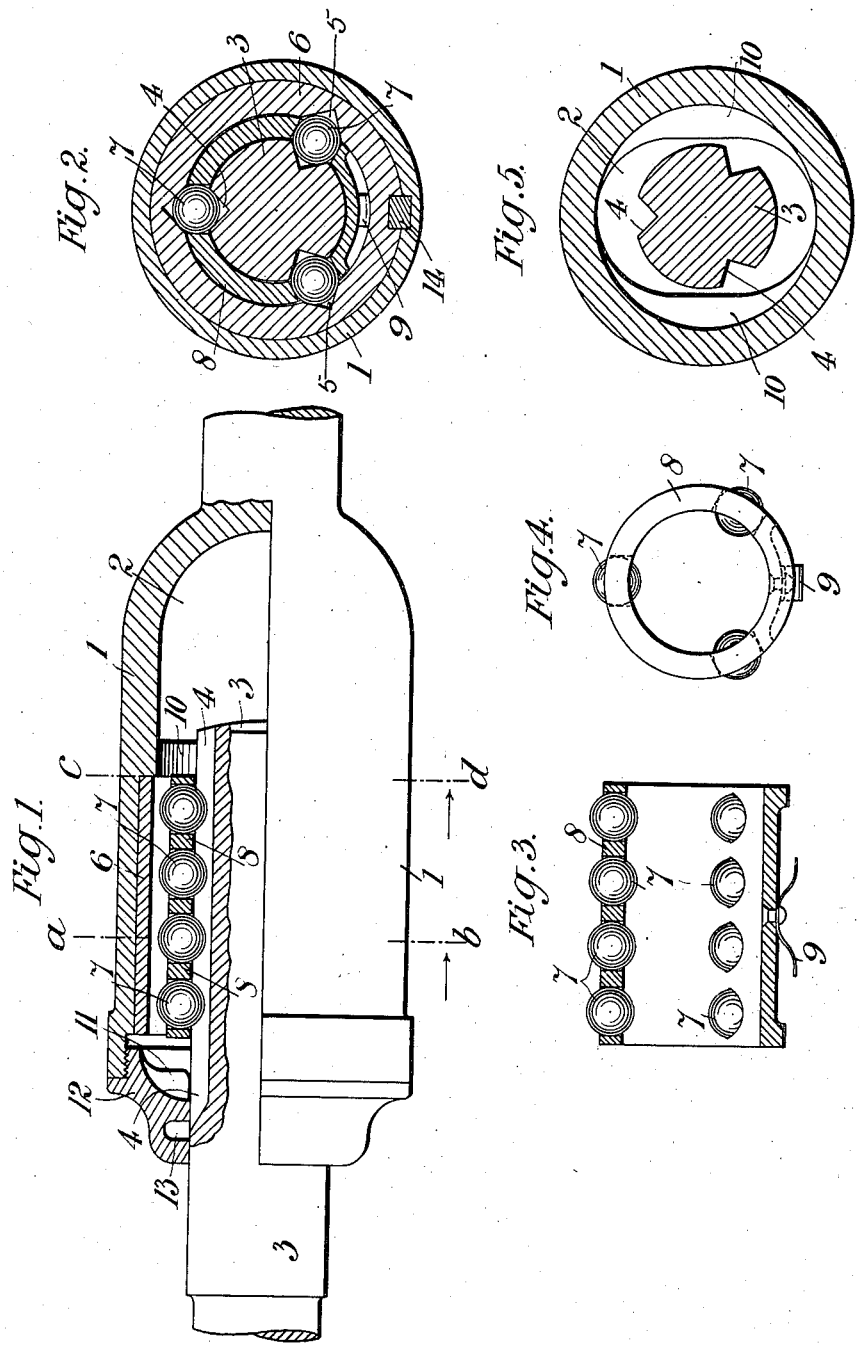
WITNESSES.
INVENTOR.

No. 754,066.

Patented March 8, 1904.

UNITED STATES PATENT OFFICE.

ERNST GUSTAV HOFFMANN, OF LONDON, ENGLAND.

TELESCOPIC JOINT FOR SHAFTING, &c.

SPECIFICATION forming part of Letters Patent No. 754,066, dated March 8, 1904.

Application filed October 5, 1903. Serial No. 175,785. (No model.)

*To all whom it may concern:*

Be it known that I, ERNST GUSTAV HOFFMANN, a subject of His Majesty the German Emperor, residing at London, England, have invented a certain new and useful Improvement in Telescopic Joints for Shafting and the Like, of which the following is a specification.

This invention relates to telescopic joints for connecting shafting and the like, with the purpose of allowing a variation in the length of the connected parts, the object in view being the formation of a telescopic joint in which ball-bearings may be used with a view to operating the parts with a minimum of friction.

In the accompanying drawings, Figure 1 is a half-sectional elevation of a telescopic joint constructed in accordance with my invention. Fig. 2 is a transverse section therethrough, on line *a b* of Fig. 1, looking in the direction of the arrows. Fig. 3 is a longitudinal section through the cage for the ball-bearings, shown separately. Fig. 4 is a transverse section therethrough, and Fig. 5 is a transverse section through the joint on line *c d* of Fig. 1 in the direction of the arrows.

The joint comprises an "outer" shaft 1, so called by reason of its carrying a socket 2 in its end for the reception of the end of the inner shaft 3. Said inner shaft carries a series of grooves 4 upon its surface, preferably approximately V-shaped, which correspond with a series of similar grooves 5, formed on the interior surface of the socket 2 or of a sleeve 6, situate in the socket 2 of the outer shaft 1 and carried thereby. Said sleeve if employed is preferably secured in the socket by a key 14, as shown in Fig. 2.

The two shafts 1 and 3 are connected by a series of balls 7 in each of the series of grooves 4 and 5, which balls are carried by a cage 8, so that they maintain their correct distance apart. The cage 8 is provided on its exterior with a spring 9 or similar device, pressing on the interior surface of the sleeve, as shown, (or said spring may be in the inside of said cage and press on the shaft 3,) to stop chattering and to prevent displacement of the said cage by concussion or from other causes. A stop 10, Figs. 1 and 5, is further provided in the interior of the sleeve to limit the longitudinal movement in one direction of the cage and balls when one of the shafts is moved longitudinally, and movement in the opposite direction is similarly limited by a second stop 11, carried by a cover 12, which cover may be screwed into the socket and form a close fit over the inner shaft, which it embraces, and be provided on the face adjacent to said shaft with a groove 13, adapted to receive a felt or other washer, so that dust is effectually excluded from the interior of the sleeve 6.

The stop 10 is shown as an internal flange in the socket 2, such flange having parts projecting into the line of travel of the cage, but it may be formed as a projection inside the socket of any suitable kind.

It will be seen that in operation the balls allow of a practically frictionless longitudinal movement of the two shafts with respect to each other, and also form the necessary coupling between the two for taking the torsional strain and acting as a sliding bearing.

What I claim is—

1. In a telescopic joint, and in combination a socket forming one of the members having a series of longitudinal grooves in its inner surface, an inner member having a corresponding series of grooves in its outer surface, a cage situate between said inner member and socket and a ball carried by said cage in each of said grooves forming a sliding bearing between the inner member and socket.

2. In a telescopic joint, and in combination a socket forming one of the members, a sleeve carried by said socket carrying a series of internal longitudinal grooves, an inner member carrying a corresponding series of external grooves, a cage situate between said inner member and sleeve and a number of balls carried by said cage in each of said grooves, forming sliding bearings between the inner member and the sleeve.

3. In a telescopic joint, and in combination, a socket forming one of the members carrying a series of internal longitudinal grooves, an inner member carrying a corresponding series of external grooves, a cage situate between the inner member and the socket, balls carried by said cage in each of said grooves, and means for limiting the longitudinal movement of the cage and balls in either direction.

4. In a telescopic joint, and in combination, a socket forming one of the members carrying a series of internal longitudinal grooves, an inner member carrying a corresponding series of external grooves, a cage situated between the inner member and the socket, balls carried by said cage in each of said grooves, and a cap carried by said socket and encircling the said inner member and forming a dust-excluding cover for the inner parts.

In testimony whereof I have hereunto set my hand in the presence of two subscribing witnesses.

ERNST GUSTAV HOFFMANN.

Witnesses:
ALLEN PARRY JONES,
A. KNIGHT CROAD.